Nov. 6, 1934.  J. EDGAR  1,979,535
ART OF HOB MANUFACTURE
Filed May 3, 1926   3 Sheets-Sheet 1
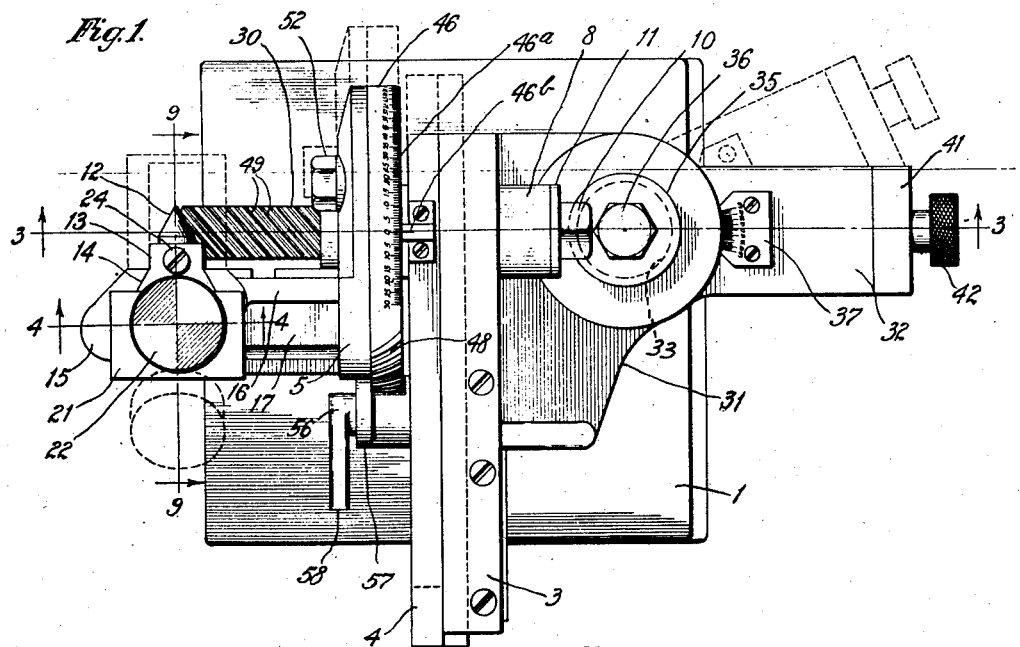
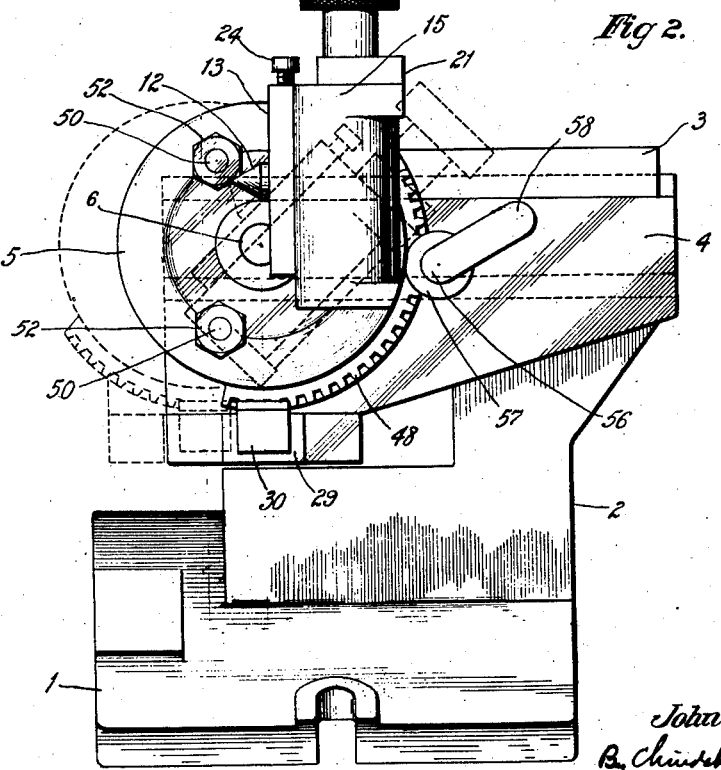
Inventor:
John Edgar
By Churchill Parks Carlson
Att'ys.

Nov. 6, 1934.   J. EDGAR   1,979,535
ART OF HOB MANUFACTURE
Filed May 3, 1926   3 Sheets-Sheet 2
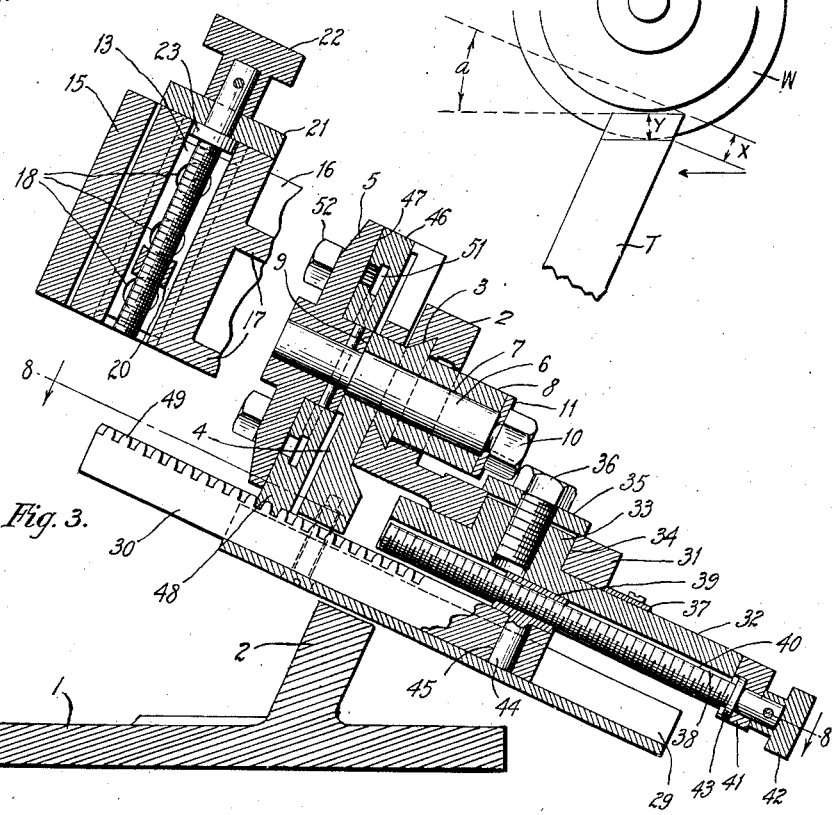
Inventor:
John Edgar Nov. 6, 1934.  J. EDGAR  1,979,535
ART OF HOB MANUFACTURE
Filed May 3, 1926   3 Sheets-Sheet 3
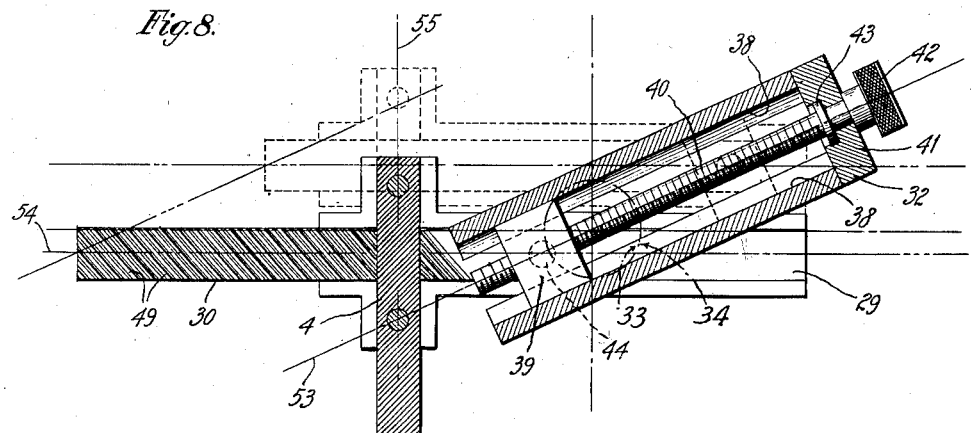
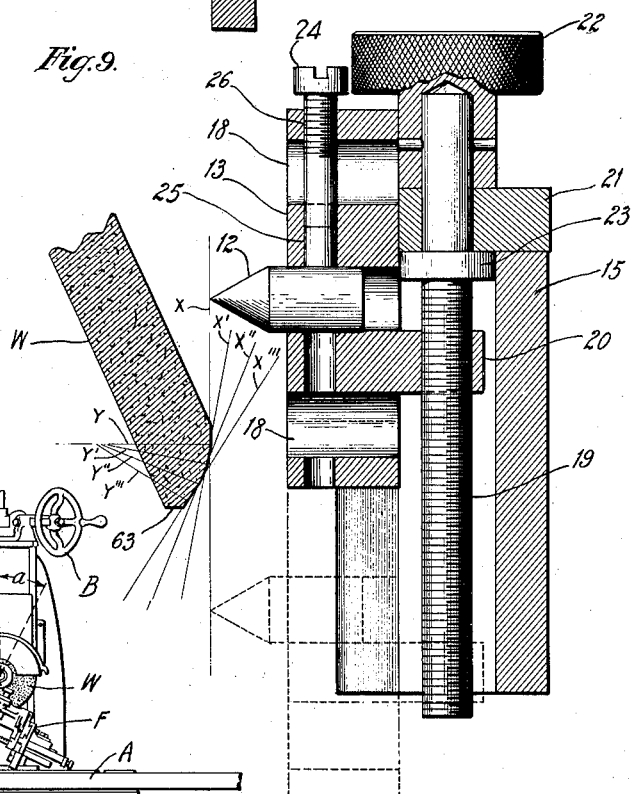
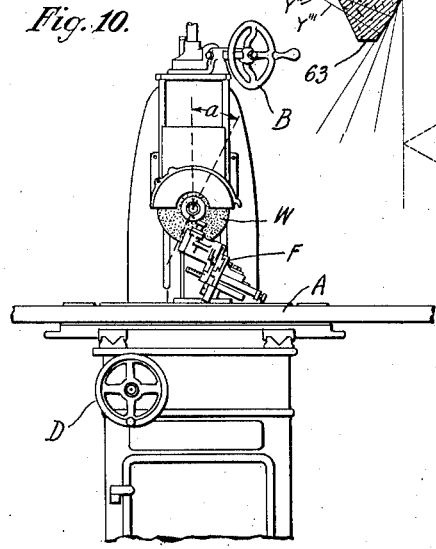
Inventor:
John Edgar
By Churchill Parker Carlson
Attys.

Patented Nov. 6, 1934

1,979,535

UNITED STATES PATENT OFFICE 1,979,535

ART OF HOB MANUFACTURE

John Edgar, Rockford, Ill., assignor to Barber-Colman Company, Rockford, Ill., a corporation of Illinois Application May 3, 1926, Serial No. 106,241

23 Claims. (Cl. 125—11)

This invention relates generally to the art of manufacturing hobs and more particularly to means adapted to be used in dressing an abrasive wheel for making a form tool which is then used to cut a hob.

The cutting of toothed power transmitting mechanisms of the straight sided tooth type such as spline shafts, sprockets and ratchets, is often done by a hobbing process, and while this method is satisfactory it has the disadvantage of requiring hobs which are costly and difficult to manufacture. Hobs of this type are now made by a process consisting of four steps. First, a master tool is made which embodies the shape to be produced by the hob, that is, if the hob is to generate a spline shaft this master tool consists of a duplicate of a section of the spline shaft. Second, this master tool is used as a templet in the shaping of a fly tool. Third, after being relieved, the fly tool is employed to shape a form tool. Fourth, the form tool is used to cut the hob. As these tools are manufactured from unhardened metal they are necessarily hardened prior to being used to shape the succeeding tool, in which case any hardening distortion must be removed by a manual process such as stoning. It is readily apparent that this method is costly and that it is difficult to maintain accuracy.

To obviate these disadvantages of the above mentioned method, I have provided a means whereby an abrasive wheel may be shaped so as to embody a matching contour of the form required on the form tool, thereby adapting it for use in grinding the said form tool to the matching shape. The form tool is then employed in cutting the aforementioned hob, and, inasmuch as the shape on the form tool is obtained by grinding, the blank tool may be a previously hardened piece of metal. It is therefore possible to secure and maintain a high degree of accuracy as no further hardening or truing is necessary.

As is well known in the art, hobs to cut spur and similar types of gears are provided with straight flat sides having the angle of obliquity required on the gear. These hobs, due to the rotary motion of the gear blanks, generate the required tooth form on the blanks. Therefore, in order to produce straight sided teeth or keys such as are required on a spline shaft, it is necessary that the generated form be provided on the hob so that when the blank shaft is rotated the aforementioned action will be reversed and the straight side will be formed on the spline shaft keys. This generated form on the hob teeth consists of a varying curve of constantly changing radii, and it is the primary object of my invention to provide a means whereby an abrasive wheel may be dressed so as to embody this curve, this means being operable without extensive mathematical computations.

In the drawings, Figure 1 is a tilted plan view of one form of the invention.

Fig. 2 is an elevational view thereof looking at the left-hand end of Fig. 1.

Fig. 3 is a sectional elevational view taken along line 3—3 of Fig. 1, but showing the device in its normal position.

Fig. 4 is a sectional view taken along line 4—4 of Fig. 1, in its relative position to Fig. 3.

Fig. 5 is a diagrammatic view illustrating the relation of the abrasive wheel, form tool, hob and spline shaft.

Fig. 6 is a fragmental view partly in section, illustrating the mounting for the dressing tool, and a detachable micrometer for use in adjusting the tool.

Fig. 7 is a diagrammatic view of a form tool in operative relation to an abrasive wheel.

Fig. 8 is a sectional view taken along the line 8—8 of Fig. 3.

Fig. 9 is a sectional view taken along the line 9—9 of Fig. 1, shown in operative relation with an abrasive wheel.

Fig. 10 is an elevational view illustrating the preferred form of the invention mounted in operative position on the table of an open face planer type surface grinder.

While my invention is susceptible of embodiment in many different forms, I have shown in the drawings and will herein describe in detail the preferred form with the understanding that the present disclosure is to be considered as an exemplification of the principles of the invention and is not intended to limit the invention to the form illustrated. The scope of the invention will be pointed out in the appended claims.

When an abrasive wheel is dressed to shape form tools, the wheel is not formed to the same shape as the tooth desired on the hob, but is formed to a shape corrected for the clearance angle of the tool. As illustrated in Fig. 7, a form tool T is being ground by a wheel W at a clearance angle $a$. It is apparent that the depth $y$ of the cut, perpendicular to the end of the tool is the vertical projection of the true depth $x$ of the form desired, i. e., the depth $y$ is equal to the depth $x$ multiplied by the cosine of the clearance angle $a$.

The invention in the form illustrated herein for purposes of disclosure, is adapted to guide a dressing device through the curve desired upon the form tool, and is also adapted to correct for the clearance angle by including means to generate the true curve in an inclined plane, and means to project this curve on a vertical plane.

As shown in Fig. 10 a device designated generally as F is mounted upon the table A of an open face planer type grinder in which an abrasive wheel W is rotatably mounted. The head carrying the wheel W is adjustable vertically by means embodying a hand wheel B, and the table A is reciprocable transversely of the axis of the wheel W by means including the hand wheel D.

The device F comprises generally an oscillatory head upon which a dressing device is adjustably mounted, and means to rotate said head and to translate its axis in timed relation to cause the dressing device to generate the desired curve. In the embodiment illustrated this curve is generated in a plane inclined at the clearance angle $a$ with respect to a vertical plane through the axis of the wheel W, the lateral movement of the table A transversely of the axis of the wheel being used to project this curve on the vertical plane as hereinafter more fully described.

Referring particularly to Figs. 1, 2 and 3, the device F comprises a base 1 adapted to be detachably mounted upon the grinder table A by any suitable means (not shown). A support or bracket 2 is shown integral with the base and inclined thereto at an angle equal to the complement of the clearance angle of the form tool to be ground. This support is provided with transverse ways 3 upon which a lead slide 4 is carried for translatory movement.

A head 5 is rotatably mounted upon the lead slide 4 for oscillation about an axis perpendicular thereto. This head, as illustrated herein, is circular in form and is pinned to a shaft 6 which is journalled for rotation in a bore 7 through the lead slide, the slide at this point having a rearwardly extending portion 8 to provide a bearing of substantial length. A shoulder 9 on the head 5 engaging the slide 4 at one end of the bearing, and a nut 10 screw threaded on the shaft 6 at the opposite end, prevent longitudinal movement of the shaft therein, a washer 11 being interposed between the nut and the slide. Thus the head 5 is oscillatory relative to the support 2, and is also transversely movable relative thereto by means of the intervening lead slide 4.

A dressing device such as a diamond pointed tool 12 is movably mounted on the head 5, so that when the head is rotated and translated simultaneously, this tool generates a curve and may be reciprocated along tangents to this curve. The mounting for this tool, illustrated in Figs. 1, 2, 4, 6 and 9, comprises a tool holder 13 slidable upon rectilinear ways 14 formed in a housing 15 carried on the head 5 by means of a bracket 16. This bracket is preferably reinforced by one or more ribs 17 to provide a rigid support for the housing.

The tool holder 13, in the preferred form, has three sockets 18 each adapted to receive the tool 12, the tool being mounted in the socket best suited for the height the wheel W will occupy during the dressing operation. The holder 13 is reciprocable on the ways 14 by means of a screw 19 engaging a threaded extension 20 of the holder. This screw is mounted in the end 21 of the housing 15 for rotational but against longitudinal movement. A thumb knob 22 is provided to permit of ready manipulation of the screw and to cooperate with a collar 23 on the screw, to prevent longitudinal movement of the screw in the housing. Suitable means may be provided to clamp the tool in either of the sockets 18, such means being herein illustrated as comprising a headed device 24 extending in a bore 25 in the holder and in screw threaded engagement therewith at 26.

As illustrated in Fig. 6 a micrometer device 27 is adapted to be detachably mounted on the bracket 16 by means of a bolt 28. The micrometer 27$^a$ is preferably calibrated to indicate zero when the point of the diamond tool 12 lies in the axis of the oscillatory head 5, and is used as hereinafter described to gauge the adjustment of the tool in accordance with the width of spline desired on the spline shaft.

As mentioned heretofore, the head 5 is oscillatory about an axis translatable with the lead slide 4 and is constrained to move in timed relation with the slide. As illustrated herein this is accomplished by providing an adjustable member and independent driving connections from this member to the head and slide, but a single positive driving connection might readily be provided directly between the head and slide.

Thus the lead slide 4 has a guideway 29 extending perpendicularly to the inclined plane of the ways 3. On this guideway a rack 30 is slidable. As viewed in Figs. 1 and 3, the support 2 has a rearwardly extending bracket 31 perpendicular to the inclined portion, upon which a lead control slide 32 is pivoted, a cylindrically formed boss 33 on the slide engaging a cylindrically surfaced bearing 34 in the bracket 31 to pivot this control slide about an axis parallel to the inclined support. A washer 35 and a bolt 36 serve to secure the control slide to the bracket in its adjusted angular position as determined by a scale 37 on the slide and a suitable mark (not shown) on the bracket.

The control slide 32 is provided with longitudinal ways 38 upon which a non-rotatable guide member or nut 39 is slidable. This member is adjustable upon the ways by means of a screw 40 journalled for rotation in a downwardly extending portion 41 of the control slide. A knob 42 on the end of the screw, is provided to facilitate manual adjustment of the nut, and together with a collar 43 on the screw, prevents longitudinal movement of the screw relative to the control slide.

A pin 44 integral with the guide member 39 extends downwardly therefrom into pivotal engagement with an aperture 45 in one end of the rack 30 so that movement of the member 39 on the ways 38 of the control slide causes the rack to move longitudinally on the guideway 29 of the lead slide 4.

A geared connection is provided between the head 5 and the rack 30, this connection being herein shown as comprising an annular collar 46 surrounding a reduced portion of the head and fitting against the rear side 47 thereof. A portion of the periphery of this collar has helical gear teeth forming a gear segment 48 adapted to mesh with spiral teeth 49 on the rack 30. The collar is adjustable angularly with respect to the head and may be secured in its adjusted position by any suitable means, as, for example, bolts 50 having their heads engaging in a slot 51 in the collar, said bolts extending through apertures in the head into engagement with nuts 52. A scale 46$^a$ is provided on the collar 46, and a zero mark 46$^b$ is placed on the slide 4, to indicate the angular position of the head 5.

With the lead control slide set at an angle, such as indicated in Fig. 8, rotation of the knob 42 imparts movement to the guide member 39 by means of the force exerted through the screw 40. This movement of the guide member 39 is confined to the guideway 38 so as to cause it to follow the line 53. As the rack 30 is confined to the guideway 29 on the lead slide 4, the pivotal connection 44 between the guide member and the rack functions also, in conjunction with the rack, as a connection between the guide member and the lead slide. Therefore any movement of the guide member along the line 53 resolves itself into component movements of the rack 30 and the lead slide 4, these movements being the longitudinal movement of the rack parallel to the line 54 and the lateral movement of the slide and rack along line 55.

As the gear segment 48 meshes with the rack teeth 49, movement of the rack will be imparted to the segment so as to cause the head 5 to rotate. The combined translatory movement of the lead slide 4 laterally and this rotary movement of the head creates a rolling action so that if the parts are initially in the full line position indicated in Figs. 1, 2 and 3, and the lead control slide or guide 32 as shown in Fig. 8, continued rotation of the knob 42 in a clockwise direction will shift them to the positions shown by the dotted lines in these figures.

Thus, as the relative displacements of the lead slide 4 and the rack 30 are right-angle components of the displacement of the guide member 39, their movements will depend upon the angular position of the lead control slide 32. Correspondingly, the relative rotary and translatory movement of the head 5 are determined by the angular position of the lead control slide.

Means may be provided to secure the lead slide 4 and the oscillatory head 5 against movement. Herein a clamping device 56 mounted on the lead slide, has a collar 57 adapted to engage the segment 48 upon manipulation of the handle 58.

As in all hob generating processes the pitch line of the blank undergoing generation is imagined as having a non-slipping contact with the pitch line of an imaginary rack, the contact of pitch lines being considered as a rolling action. The rolling action which has been mentioned hereinbefore is analogous to this. Thus in Fig. 5 the dot-dash line 59 represents the pitch line of the spline shaft 60 and the line 61 indicates the base or pitch line of the hob 62. During the generation of the spline shaft these pitch lines are adapted to roll one upon the other in the manner mentioned above.

As the translatory movement of the lead slide 4 is determined by the angular position of the lead control slide 32, the lead is dependent upon the angular position of the control slide. It is apparent, therefore, that this control slide must be fixed during the generation of the curve. The angular position of the slide is determined by the following formula:

$$\frac{C}{X} = \tan M$$

wherein
C = the circumference of the pitch circle of the spline shaft,
M = the angle to which the control slide 32 is set relative to the rack 30, and
X = a constant determined by the formula $X = Y \tan p$ wherein
Y = the pitch line circumference of the segment 48, and
p = the angle of inclination of the teeth of the rack 30.

To determine the initial position of the tool 12 relative to the wheel W a mathematical computation is necessary because the wheel must be positioned so as to be dressed to grind to the proper depth in the form tool in order that the key ways of the spline shaft will be of the desired depth. In determining this initial position of the tool, provision must be made for the width of the spline shaft keys and also for the cosine of the angle of clearance of the form tool.

The device F is placed upon the table A with the ways 3 perpendicular to the line of movement of the table transversely of the axis of the wheel W. As the micrometer $27^a$ registers zero when the diamond point lies in the axis of the head 5 the micrometer is adjusted to read one-half the width of the spline shaft key and the diamond tool set to that position. After the tool is positioned the nuts 52 are loosened and the head 5 is swung 90 degrees from the position shown in Fig. 2 so that the periphery of the wheel W may be trued, the diamond being reciprocated across the face of the wheel by means of the knob 22 to form the horizontal face 63 (Fig. 9). After the wheel is trued the head is swung back to the position shown in full lines in the drawings and the wheel W is raised by the means operable by the wheel B. The position of the wheel W is determined by the formula $$P = (R - \tfrac{1}{2}K) \cos a$$

wherein:
P = the distance the wheel W is raised from the position it occupied after being trued in the manner just described,
R = the radius of the root of the spline shaft key ways,
K = the width of the keys, and
a = the angle of clearance.

Fig. 9 depicts the relation of the diamond tool 12 and the abrasive wheel W. A series of diagrammatic lines $x\ x'$ etc. and $y\ y'$ etc. are shown to indicate on a greatly enlarged scale the path through which the diamond tool 12 passes across the surface of the wheel in constantly varied positions of the head 5, and the changing radii caused by the movement of the lead slide. The rotation of the head causes the angular inclination of the diamond tool. In a manner hereinafter described the tool is contacted with the wheel W, the angular inclination of the tool creating the varying curve and the translatory movement of the lead slide 4. altering the lead, and, therefore, the length of the radii.

After the lead control slide 32 has been positioned, the tool 12 set to ½K, the base 1 placed upon the table A, the periphery of the wheel W trued, and the wheel W raised to the position just determined, by manipulation of the wheel B, the dressing operation is as follows:

Assuming the oscillatory head 5 in the full line position illustrated in the drawings, rotation of the knob 42 in a clockwise direction causes the tool 12 to generate the desired curve.

It is to be understood, however, that the rotation of the knob 42 is not a continuous process during the generation of the curve, but is a step by step process. That is, at the start of the generation the tool 12 is set as hereinbefore described. After the tool is positioned the knob 42 is rotated so as to move the oscillatory head through an arc, say of one degree on the scale $46^a$. With the head and lead slide in this position, the table A is reciprocated transversely of the axis of the wheel W by means of the hand wheel D. For each reciprocation the knob 22 is rotated so as to cause the diamond to travel back and forth in a longitudinal plane. In operation, after the diamond tool has been passed across the face of the wheel, the knob 42 is rotated so as to advance the oscillatory head again, a distance of, say one degree, and the table is again reciprocated during rotation of the knob 22. Thus the rotation of the knob 42 causes the diamond tool to generate the curve in the inclined plane and the reciprocation of the table A by means of the hand wheel D projects this curve on a vertical plane to correct for the clearance angle.

It is to be noted that the diamond tool 12 is given a duplex motion, that is, it is reciprocated laterally across the axis of the wheel W by movement of the table A, and is reciprocated at an angel to said lateral reciprocation by means of the knob 22. This duplex movement of the diamond tool for each setting of the knob 42 causes it to describe planes. As illustrated in Fig. 9, these planes form lines or so-called flats on the surface of the wheel, which constitute the contour of the curve. From this it may be seen that the curve is not a true arc but is formed of a series of minute chords. These chords or flats are generally similar to those formed on fly-tools when they are generated. They are so minute that the contour is recognized as a true curve. Further, this plane generation perpendicular to the end of the form tool projects the curve generated in the inclined plane, onto the vertical plane to compensate for the fore-shortened form required on the end of the tool because of the clearance angle, and thereby provides the correct form to the cutting edge of the tool.

When the wheel is dressed, both sides of the form tool may be ground since the sides are identical when the section of the teeth of the power transmitting mechanism is symmetrical with respect to a radius. In cases where the section of the teeth is not symmetrical a different wheel is shaped for each side and the distance of each side from the radial line is used for the value ½K.

Another exception in the initial positioning of the diamond tool is that of a ratchet having radial teeth, in which case the diamond point is set radially as the value of ½K is zero.

After the wheel W is dressed the tool T is positioned as in Fig. 7 and ground to shape. The tool is then used to shape a hob.

From the foregoing, it will be apparent that I have provided a means for dressing an abrasive wheel to the contour of a form tool which is to be used for cutting hobs, this contour being modified to compensate for the clearance angle of the tool. In this way I have eliminated the necessity for making a master tool or templet as required by methods heretofore used, and permit a prehardened form tool blank to be shaped directly by means of the abrasive wheel. This also obviates any hardening of the form tool after shaping, and the truing which has been necessary after shaping an unhardened tool.

Although I have illustrated and described the invention in its preferred form as a means for dressing an abrasive wheel, it will be obvious that a cutting tool may readily be substituted for the dressing device, and a fly or other cutting tool may then be shaped to a predetermined contour in place of the abrasive wheel.

I claim as my invention:

1. A device of the character described comprising, in combination, a base, a support on said base, a lead slide translatable thereon, a guideway carried by said lead slide and perpendicular thereto, a rack slidable on said guideway, a lead control slide angularly adjustable on said support about an axis parallel thereto, a guideway on said lead control slide, a guide member on said last mentioned guideway, means to move said member on said last mentioned guideway, a pivotal connection between said member and said rack, an oscillatory head on said lead slide, a gear segment adjustable on said head and engaging said rack, a tool holder slidable rectilinearly on said head, a dressing device in said holder, and means to adjust said tool holder on said head.

2. A device of the character described comprising, in combination, a base, a support on said base, a lead slide movable transversely thereon, a guideway on said lead slide and perpendicular thereto, a rack slidable in said guideway, a lead control slide carried on said support and adjustable angularly to said lead slide, means pivoted on said rack and adjustable longitudinally on said lead control slide, an oscillatory head on said lead slide in toothed engagement with said rack, and a tool holder adjustable on said head.

3. In a device of the character described, the combination of a support, a lead slide thereon, a rack on said lead slide movable perpendicularly to the line of movement of said lead slide, a lead control slide adjustable angularly on said support, means adjustable longitudinally on said lead control slide and pivotally connected to said rack, and a head pivoted on said lead slide and having toothed engagement with said rack.

4. In a device of the character described, the combination of a translatable lead slide, an oscillatory head thereon, a rack movable laterally with and independently perpendicularly to said lead slide and in toothed engagement with said head, a lead control slide adjustable angularly with respect to said lead slide, and means in pivoted engagement with said rack and adjustable longitudinally on said lead control slide.

5. In a device of the character described, the combination of a support, a slide movable transversely thereon, an oscillatory head on said slide, a tool holder mounted eccentrically on said head and means to oscillate said head and to translate said slide in continuous timed relation, said means including an adjustable member and positive driving connections from said member to the head and slide.

6. In a device of the character described, the combination of a support, a slide movable transversely thereon, an oscillatory head mounted on said slide for rotation on an axis perpendicular to the direction of movement of said slide, said head carrying a dressing tool, and means to constrain said head to oscillate in continuous timed relation to the translation of said slide said means including a member adjustable in a rectilinear path disposed at an angle to the movement of said slide.

7. In a device of the character described, the combination of a support, a slide movable transversely thereon, an oscillatory head on said slide movable in timed relation thereto, a tool holder slidable rectilinearly on said head, means to reciprocate said holder on said head, and means to reciprocate said tool holder rectilinearly at an angle to said first rectilinear movement.

8. In a device of the character described, the combination of a lead slide mounted for translatory movement, an oscillatory head rotatable on said slide on an axis perpendicular to the direction of movement of said slide, a tool holder reciprocable transversely of said axis on said head, and means to translate said lead slide and to oscillate said head in timed relation comprising a member guided for rectilinear movement at an angle to said lead slide and movably connected to said slide and head.

9. In a device of the character described, the combination of a lead slide mounted for translatory movement, an oscillatory head on said slide, a tool holder adjustable on said head, means to translate said lead slide and to oscillate said head comprising a member guided for rectilinear movement at an angle to said lead slide and movably connected to said slide and head, and means to vary said angle.

10. In a dresser for an abrasive wheel rotatable about an axis, a support inclined to its plane of movement reciprocable transversely of the said axis, a lead slide on said support and movable transversely of the face of said wheel, an oscillatory head pivotally mounted on said lead slide on an axis perpendicular to the direction of movement of said slide and to the inclined plane of said support, a tool holder transversely reciprocable on said head and carrying a tool adapted to dress said wheel, and means adapted simultaneously to oscillate said head on said slide and to translate said lead slide.

11. In a dresser for an abrasive wheel rotatable about an axis, a table reciprocable transversely of the said axis, a support on said table, a lead slide on said support and movable transversely of the face of said wheel, an oscillatory head on said lead slide movable in timed relation thereto, and a tool holder reciprocable on said head and carrying a tool adapted to dress said wheel.

12. In a device of the character described, for dressing an abrasive wheel rotatable about an axis, a table reciprocable transversely of said axis, a support on said table inclined to the direction of table movement, a head movably mounted on said support, a tool holder reciprocable on said head, a tool carried by said holder and adapted to dress said wheel, means to guide said head to cause said tool to describe a curve in a plane parallel to said support, means to reciprocate said holder, and means to reciprocate said table.

13. In a device of the character described, for dressing an abrasive wheel rotatable about an axis, a support reciprocable transversely of said axis, a head movably mounted on the face of said support, a tool holder reciprocable on said head, a tool carried by said holder and adapted to dress said wheel, means to guide said head to cause said tool to describe a curve in a plane parallel to the face of said support, and means to reciprocate said tool holder independently of said guide means.

14. In a dresser for an abrasive wheel rotatable about an axis, a support movable transversely of said axis and having a face inclined to its direction of movement, a head movably mounted on the face of said support, a tool holder on said head, a tool carried by said holder and adapted to dress said wheel, means to guide said head to move said tool in a curve in a plane parallel to the inclined face of said support, and means to impart a duplex movement to said tool independently of said guide means.

15. In a device of the character described, the combination of a support, a tool holder adjustable thereon, a tool in said holder, means to adjust said tool holder along a curved path on said support, and means to impart duplex movements to said tool in planes tangent to said path, independently of said adjustable movement.

16. In a device of the character described, for dressing an abrading or cutting wheel, a movable inclined support, a tool holder adjustable in a curved path on said support, a tool in said holder adapted to shape said wheel, means to move said holder along said path, means to move said tool holder tangentially of said path, and means to reciprocate said tool parallel to said wheel.

17. The method of dressing an abrasive wheel for shaping form tools which comprises rotating the wheel about an axis, moving a tool step by step along a curved path in a plane, moving said tool step by step along a tangent to said curve at each step of said first movement, and reciprocating said tool parallel to said wheel during each step of said tangential movement relative to the curve.

18. In a dresser for an abrasive wheel rotatable about an axis, a table reciprocable transversely of said axis, a support on said table having a face inclined to the direction of table movement and parallel to said axis, a slide on the face of said support movable transversely of said wheel, an oscillatory head on said slide rotatable in timed relation to the movement of said slide, and a tool holder reciprocable on said head in a path parallel to the face of said support and carrying a tool adapted to dress said wheel.

19. The method of dressing an abrasive wheel for shaping form tools which comprises, rotating the wheel about an axis, moving a tool step by step along a curved path in a plane, moving said tool step by step along a tangent to said curve at each step of said movement and reciprocating said tool parallel to said wheel during each step of said tangential movement relative to the curve, the plane of said curve being inclined at an angle to said reciprocatory movement complementary to the clearance angle of a tool to be formed by the dressed wheel.

20. In a device of the character described, the combination of a support, a slide thereon, a head oscillatable on an axis perpendicular to said slide, means to actuate said slide and said head in timed relation relative to each other embodying means to vary the relative movement of the slide and head, and a tool transversely slidable upon said head.

21. In a wheel truing device having a table, a grinding wheel blank, means for rotating said blank, a removable fixture rotatably mounted adjacent said blank on said table, means on said fixture to form on said blank a shape tangential to a predetermined curved or helicoidal surface, a removable guide mounted on said device, and means mounted on said device and cooperating with said guide to control the rotation of said fixture.

22. In a device of the character described for dressing an abrasive wheel rotatable about an axis, a support, a slide mounted on said support for reciprocation in a direction generally parallel to said axis, a head mounted on said slide for oscillation in a plane parallel to a plane through said axis, a tool transversely slidable on said head, means to actuate said slide and said head in timed relation to move said tool through a predetermined involute curve in said first mentioned plane and embodying means for adjusting the relative movement of said slide and said head to vary said curve, and means for projecting the movement of said tool along said curve onto said wheel.

23. In a device of the character described for dressing an abrasive wheel rotatable about an axis, a support, a slide mounted on said support for reciprocation in a direction generally parallel to said axis, a head mounted on said slide for oscillation on an axis perpendicular to said slide, a tool transversely slidable on said head, means to actuate said slide and said head in timed relation to move said tool through a predetermined involute curve in a plane inclined to a plane through said first mentioned axis and embodying means for adjusting the relative movement of said slide and said head to vary the shape of said curve, and means for projecting the movement of said tool along said curve onto said last mentioned plane to produce a contour on said wheel which is a foreshortened form of said curve.

JOHN EDGAR.